(12) United States Patent
Sakurai

(10) Patent No.: US 10,192,501 B2
(45) Date of Patent: Jan. 29, 2019

(54) LIQUID CRYSTAL DISPLAY DEVICE WITH COLOR PIXELS AND SUBPIXELS

(71) Applicant: SHARP KABUSHIKI KAISHA, Sakai, Osaka (JP)

(72) Inventor: Takehisa Sakurai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/568,421

(22) PCT Filed: Apr. 18, 2016

(86) PCT No.: PCT/JP2016/062226
§ 371 (c)(1),
(2) Date: Oct. 20, 2017

(87) PCT Pub. No.: WO2016/171096
PCT Pub. Date: Oct. 27, 2016

(65) Prior Publication Data
US 2018/0108307 A1    Apr. 19, 2018

(30) Foreign Application Priority Data

Apr. 24, 2015 (JP) ................ 2015-089682

(51) Int. Cl.
*G09G 3/36* (2006.01)
*G02F 1/133* (2006.01)
(Continued)

(52) U.S. Cl.
CPC ........... *G09G 3/3614* (2013.01); *G02F 1/133* (2013.01); *G02F 1/1335* (2013.01);
(Continued)

(58) Field of Classification Search
CPC .. G09G 3/3614; G09G 3/3677; G09G 3/3688; G09G 3/3607; G02F 1/13306;
(Continued)

(56) References Cited

U.S. PATENT DOCUMENTS

2003/0107543 A1   6/2003  Nakano et al.
2004/0239605 A1*  12/2004  Wang ................... G09G 3/3614
                                                                345/96
(Continued)

FOREIGN PATENT DOCUMENTS

JP       S60-3698 A      1/1985
JP       4-223428 A      8/1992
(Continued)

*Primary Examiner* — Jennifer T Nguyen
(74) *Attorney, Agent, or Firm* — ScienBiziP, P.C.

(57) ABSTRACT

The present invention provides a liquid crystal display device with excellent display quality in which the color shift is reduced without increasing power consumption. The present invention relates to a liquid crystal display device including: first pixels and second pixels arranged on a display surface, each pixel including a red sub-pixel, a green sub-pixel, and a blue sub-pixel; a color filter substrate; a liquid crystal layer; and an array substrate, the color filter substrate, the liquid crystal layer, and the array substrate being arranged in the stated order, the color filter substrate including: red color filters, green color filters, and blue color filters, the array substrate including: red sub-pixel electrodes; green sub-pixel electrodes; blue sub-pixel electrodes; first driving signal lines connected to the red sub-pixel electrodes and the green sub-pixel electrodes constituting the first pixels and to the blue sub-pixel electrodes constituting the second pixels; and second driving signal lines connected to the blue sub-pixel electrodes constituting the first pixels and to the red sub-pixel electrodes and the green sub-pixel electrodes constituting the second pixels, wherein AC voltage driving is performed such that, in each first pixel (Continued)

and in each second pixel, a voltage of the same polarity is applied to the red sub-pixel electrode and the green sub-pixel electrode and a voltage of a polarity opposite to that of the green sub-pixel electrode is applied to the blue sub-pixel electrode.

5 Claims, 7 Drawing Sheets

(51) Int. Cl.
  *G02F 1/1335* (2006.01)
  *G02F 1/1343* (2006.01)
  *G02F 1/1368* (2006.01)
  *G09G 3/20* (2006.01)
  *G02F 1/1362* (2006.01)

(52) U.S. Cl.
  CPC .......... *G02F 1/1343* (2013.01); *G02F 1/1368* (2013.01); *G02F 1/13306* (2013.01); *G02F 1/134309* (2013.01); *G02F 1/136286* (2013.01); *G09G 3/20* (2013.01); *G09G 3/36* (2013.01); *G09G 3/3607* (2013.01); *G09G 3/3677* (2013.01); *G09G 3/3688* (2013.01); *G02F 1/133514* (2013.01); *G02F 2001/134345* (2013.01); *G09G 2300/0426* (2013.01); *G09G 2300/0452* (2013.01); *G09G 2320/0242* (2013.01); *G09G 2320/0247* (2013.01); *G09G 2330/023* (2013.01)

(58) Field of Classification Search
  CPC .......... G02F 1/134309; G02F 1/136286; G02F 1/133514
  USPC ................................ 345/87, 89, 96, 98, 204
  See application file for complete search history.

(56) References Cited

U.S. PATENT DOCUMENTS

| | | | |
|---|---|---|---|
| 2009/0174642 | A1 | 7/2009 | Min et al. |
| 2010/0001942 | A1* | 1/2010 | Lin .................. G09G 3/3614 345/100 |
| 2012/0026151 | A1* | 2/2012 | Kim .................. G09G 3/3614 345/212 |
| 2014/0368773 | A1 | 12/2014 | Okita et al. |
| 2015/0213772 | A1* | 7/2015 | Tung .................. G09G 3/3614 345/694 |

FOREIGN PATENT DOCUMENTS

| | | |
|---|---|---|
| JP | 2003-177375 A | 6/2003 |
| JP | 2006-106062 A | 4/2006 |
| JP | 2009-163238 A | 7/2009 |
| JP | 2015-001618 A | 1/2015 |

* cited by examiner

Prior Art

LIQUID CRYSTAL DISPLAY DEVICE WITH COLOR PIXELS AND SUBPIXELS

TECHNICAL FIELD

The present invention relates to a liquid crystal display device. More specifically, the present invention relates to an active matrix type liquid crystal display device.

BACKGROUND ART

An active matrix type liquid crystal display device includes a liquid crystal display panel, a scanning line drive circuit and a signal line drive circuit which supply signals to be input in the liquid crystal display panel, and a display control circuit that controls the entire liquid crystal display device. The liquid crystal display panel displays images in the following manner, for example: the alignment of liquid crystal molecules contained in a liquid crystal layer enclosed between a pair of transparent substrates is changed to generate a phase difference by applying a voltage between electrodes provided on the liquid crystal layer side of each transparent substrate so as to control the amount of light passing through a polarizing plate provided on the outer side of each transparent substrate. To display color images on the liquid crystal display device, color filters of multiple colors are formed inside the liquid crystal display panel, and these color filters of multiple colors are arranged in juxtaposition for color display.

The liquid crystal display panel includes multiple signal lines and multiple scanning lines intersecting the multiple signal lines. Pixel electrodes are located at these intersections to form a matrix. At each of the intersections, a switching element, such as a thin film transistor (TFT), is provided. The TFT is driven upon input of a scanning line signal from the scanning line drive circuit (also referred to as "gate driver"), and writes the signal line voltage that was input from the signal line drive circuit (also referred to as "source driver") into the liquid crystal layer through the corresponding pixel electrode. When no scanning line signal is input from the scanning line drive circuit, the previous signal line voltage is held in the liquid crystal layer.

Generally, the liquid crystal display device is AC-driven to protect properties of liquid crystal materials.

Specifically, polarity-reversal driving is performed in which the same voltage of the opposite polarity is periodically applied to the pixel electrodes. The following examples of the polarity-reversal driving have been suggested: frame-reversal driving in which the polarity of the entire panel is periodically reversed; line-reversal driving in which the polarity of each driving line is reversed; and dot-reversal driving in which the polarity of each scanning line and each signal line is reversed. Examples of the line-reversal driving include gate line-reversal driving in which the polarity of each scanning line is reversed, and source line-reversal driving in which the polarity of each signal line is reversed.

In line-reversal driving, the pixel electrodes to which a voltage of the same polarity is applied are linearly aligned, so that display defects, such as streaks, flicker, and shadows, attributable to the difference in luminance may be visible. In dot-reversal driving, the polarity of each sub-pixel is reversed, so that display defects that may occur in line-reversal driving do not occur; however, the concurrent output voltage is twice as high as the driving voltage, so that the power consumption to drive the IC is unfortunately high.

Thus, in order to reduce the driving voltage of the liquid crystal display device, pseudo dot-reversal driving based on so-called staggered input method in which pixels to be connected to the same driving line are displaced vertically and transversely so that these pixels are not on the same driving line has been designed for line-reversal driving (for example, Patent Literatures 1 to 6). Display defects can be reduced by employing pseudo dot-reversal driving, as is the case with dot-reversal driving. FIG. 9 is a schematic plan view of an array substrate of a liquid crystal display device according to Patent Literature 3. For example, in the case of Patent Literature 3, as shown in FIG. 9, a liquid crystal display panel 300 includes multiple data lines Ls and multiple scanning signal lines Lg, wherein the multiple data lines Ls are laid out in a grid form so as to intersect with the multiple scanning signal lines Lg, and multiple pixel forming units Px are provided at positions corresponding to the intersections between the multiple data lines Ls and the multiple scanning signal lines Lg. Rj, Gj, and Bj (j=1, 2, or 3) indicate data signals that are applied to the respective data lines Ls. SS1, SS2, SS3, and SS4 indicate scanning signals that are applied to the respective scanning signal lines Lg. A portion surrounded by dotted lines corresponds to one pixel. In Patent Literature 3, the pixel electrodes to be simultaneously selected, which are pixel electrodes connected to switching elements that are turned on and off by the same scanning signal line, are arranged dispersedly in two pixel rows vertically adjacent to each other and such that a series of three vertically arranged pixel electrodes Px ("upper, lower, and upper" pixel electrodes Px or "lower, upper, and lower" pixel electrodes Px) as a unit is periodically repeated in the horizontal direction. In FIG. 9, "+" and "−" indicate the polarity of a signal to be applied to the pixel electrodes Px. R, G, and B indicate colors (red, green, and blue, respectively) of sub-pixels arranged in positions corresponding to the pixel electrodes Px.

CITATION LIST

Patent Literature

Patent Literature 1: JP-A S60-3698
Patent Literature 2: JP-A H4-223428
Patent Literature 3: JP-A 2003-177375
Patent Literature 4: JP-A 2006-106062
Patent Literature 5: JP-A 2009-163238
Patent Literature 6: JP-A 2015-1618

SUMMARY OF INVENTION

Technical Problem

In Patent Literature 3, signals of the same polarity are applied to all the pixels of the same color in the direction of the scanning signal lines. Thus, unfortunately, the brightness varies in each row in the direction of the scanning signal lines. In addition, in the case of low-frequency driving in a normally black mode in which black is displayed when no voltage is applied and white is displayed when a voltage is applied, unfortunately, so-called color shift occurs in which the color change is visible depending on the polarity of the applied voltage when white is displayed.

The present invention was made in view of the current situation described above, and aims to provide a liquid crystal display device with excellent display quality in which the color shift is reduced without increasing power consumption.

Solution to Problem

The present inventor examined the cause of a color shift phenomenon that occurs when white is displayed during frame-reversal driving in low-frequency driving. Observation of monochromatic display in each of red, green, and blue by varying the applied voltage revealed that the brightness of each of these colors was different depending on the polarity. FIG. 8 is a graph showing a relationship between applied voltage and brightness of sub-pixels. When white is displayed on a liquid crystal display device, a green sub-pixel having the highest luminosity factor is used as a reference to determine a voltage V(x) at which the average luminance of green sub-pixels when the polarity is positive (G+) and when the polarity is negative (G−) is the maximum. Then, the same voltage V(x) is applied to drive blue and red sub-pixels. As shown in FIG. 8, upon application of the voltage V(x), the green sub-pixel and the red sub-pixel become dark when the polarity is positive (G+, R+) and become bright when the polarity is negative (G−, R−). Conversely, the blue sub-pixel becomes bright when the polarity is positive (B+) and becomes dark when the polarity is negative (B−). Thus, when white is displayed, the white appears blueish when the polarity is positive and appears yellowish that is a combination of red and green when the polarity is negative. It was found that the color change was significant when the driving frequency was low. In Patent Literature 3, in each of the pixels, the red sub-pixel and the blue sub-pixel are driven with the same polarity. Yet, in each of the red sub-pixel and the blue sub-pixel, the brightness varies depending on the polarity, and the red sub-pixel is dark when the blue sub-pixel is bright and vice versa with the opposite polarity. Thus, the color change is observable.

In addition, it is known as the chromatic temporal frequency response that the red-green hue is perceived with higher sensitivity than the blue-yellow hue, and that changes in hue between red and green are more easily visible than changes in hue between blue and yellow at a lower luminance. Thus, presumably, when white is displayed during frame-reversal driving in low-frequency driving, changes in hue between blue and yellow occur but are not easily visible since the blue-yellow hue is perceived with low sensitivity.

Thus, in a liquid crystal display device including first pixels and second pixels arranged on a display surface, each pixel including a red sub-pixel, a green sub-pixel, and a blue sub-pixel, the present inventor employed pseudo dot-reversal driving based on so-called staggered input method through first driving signal lines connected to the red sub-pixel electrodes and the green sub-pixel electrodes constituting the first pixels and to the blue sub-pixel electrodes constituting the second pixels and through second driving signal lines connected to the blue sub-pixel electrodes constituting the first pixels and to the red sub-pixel electrodes and the green sub-pixel electrodes constituting the second pixels. As a result, the present inventor found that such pseudo dot-reversal driving can reduce the power consumption and can also reduce display defects such as flicker and shadows. The present inventor also found that the color shift can be reduced by employing AC voltage driving such that, in each first pixel and in each second pixel, a voltage of the same polarity is applied to the red sub-pixel electrode and the green sub-pixel electrode and a voltage of a polarity opposite to that of the green sub-pixel electrode is applied to the blue sub-pixel electrode. Thus, the above problems were successfully solved, and the present invention was accomplished.

Specifically, according to an aspect of the present invention, there is provided a liquid crystal display device including: first pixels and second pixels arranged on a display surface, each pixel including a red sub-pixel, a green sub-pixel, and a blue sub-pixel; a color filter substrate; a liquid crystal layer; and an array substrate, the color filter substrate, the liquid crystal layer, and the array substrate being arranged in the stated order, the color filter substrate including: red color filters, green color filters, and blue color filters, the array substrate including: red sub-pixel electrodes arranged opposite to the red color filters across the liquid crystal layer; green sub-pixel electrodes arranged opposite to the green color filters across the liquid crystal layer; blue sub-pixel electrodes arranged opposite to the blue color filters across the liquid crystal layer; first driving signal lines connected to the red sub-pixel electrodes and the green sub-pixel electrodes constituting the first pixels and to the blue sub-pixel electrodes constituting the second pixels; and second driving signal lines connected to the blue sub-pixel electrodes constituting the first pixels and to the red sub-pixel electrodes and the green sub-pixel electrodes constituting the second pixels, wherein AC voltage driving is performed such that, in each first pixel and in each second pixel a voltage of the same polarity is applied to the red sub-pixel electrode and the green sub-pixel electrode and a voltage of a polarity opposite to that of the green sub-pixel electrode is applied to the blue sub-pixel electrode.

Advantageous Effects of Invention

The present invention can provide a liquid crystal display device with excellent display quality in which the color shift is reduced without increasing power consumption.

DESCRIPTION OF EMBODIMENTS

Embodiments of the present invention are described below. The present invention is not limited to the following embodiments, and design change can be made as appropriate within the scope of the present invention.

Embodiment 1

Figure 1:
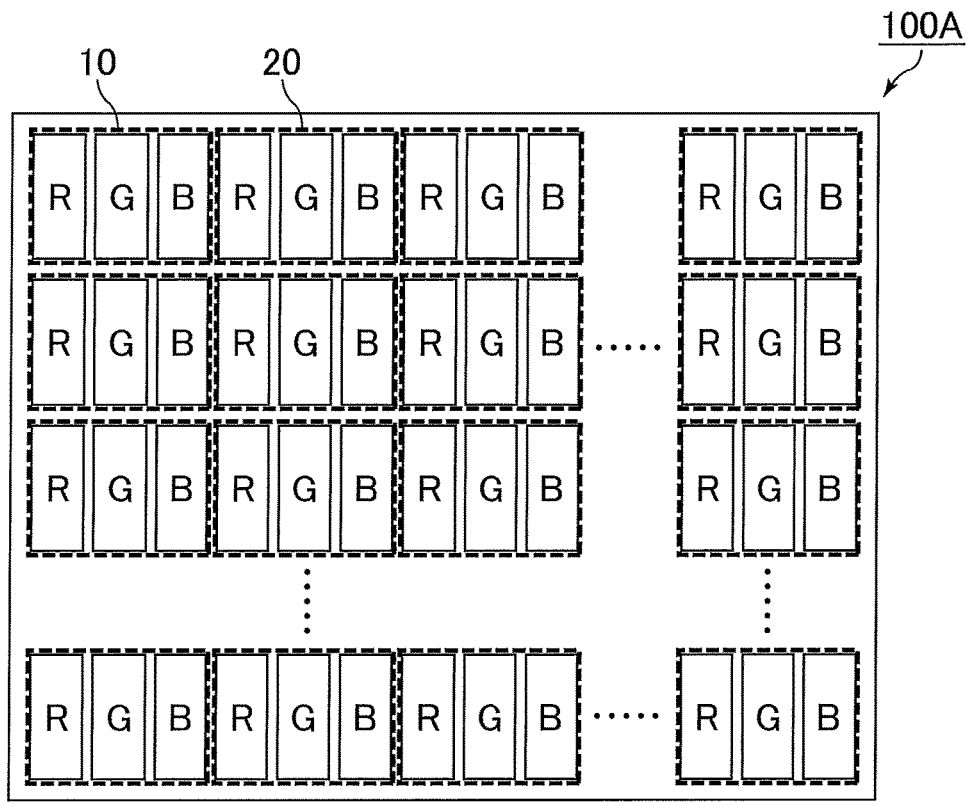
FIG. 1 is a schematic plan view of a liquid crystal display device according to Embodiment 1.
Figure 2:
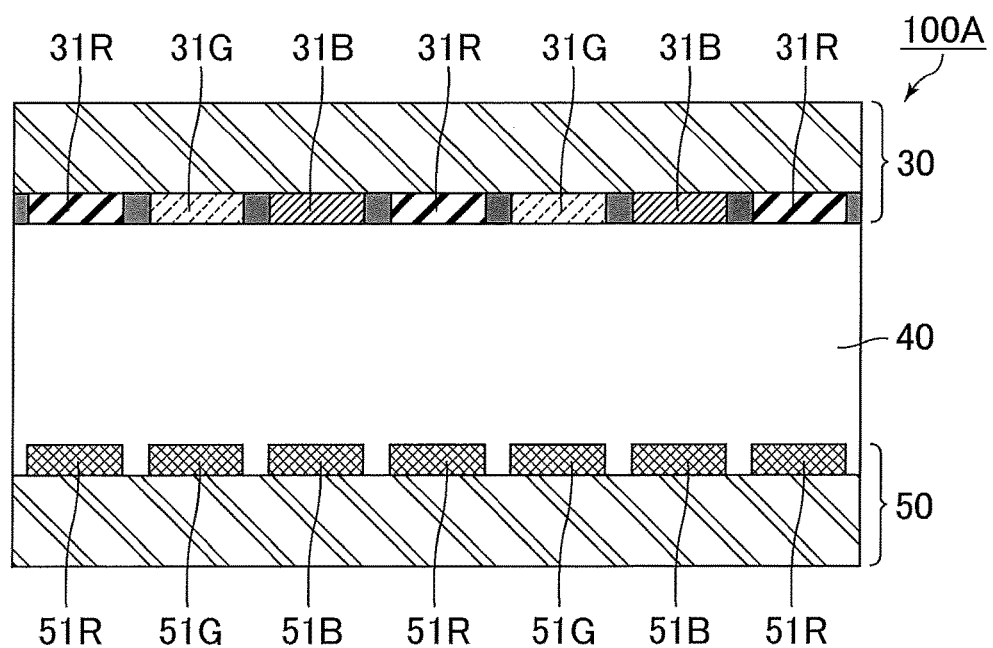
FIG. 2 is a schematic cross-sectional view of the liquid crystal display device according to Embodiment 1.
Figure 3:
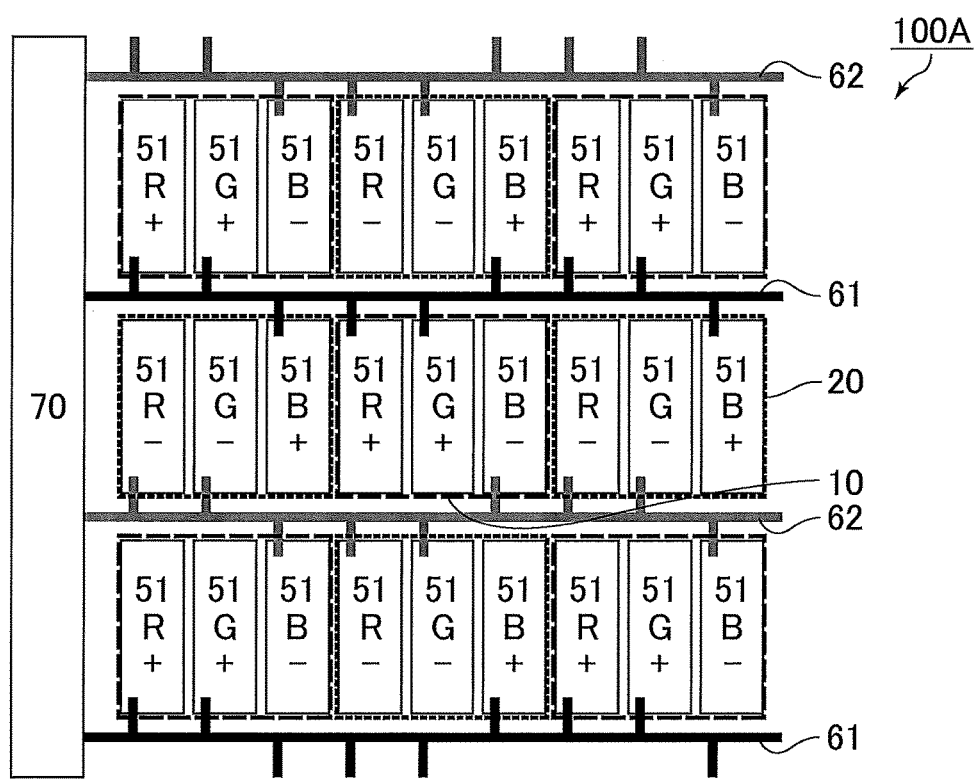
FIG. 3 is a schematic plan view of an array substrate of the liquid crystal display device according to Embodiment 1.

FIG. 1 is a schematic plan view of a liquid crystal display device according to Embodiment 1. FIG. 2 is a schematic cross-sectional view of the liquid crystal display device according to Embodiment 1. FIG. 3 is a schematic plan view of an array substrate of the liquid crystal display device according to Embodiment 1. As shown in FIG. 1, a liquid crystal display device 100A according to Embodiment 1 includes first pixels 10 and second pixels 20 arranged on a display surface, each pixel including a red sub-pixel R, a green sub-pixel G, and a blue sub-pixel B. In addition, as shown in FIG. 2, the liquid crystal display device 100A according to Embodiment 1 includes a color filter substrate 30, a liquid crystal layer 40, and an array substrate 50 arranged in the stated order. The color filter substrate 30 includes red color filters 31R, green color filters 31G, and blue color filters 31B, and the array substrate 50 includes red sub-pixel electrodes 51R arranged opposite to the red color filters 31R across the liquid crystal layer 40, green sub-pixel electrodes 51G arranged opposite to green color filters 31G across the liquid crystal layer 40, and blue sub-pixel electrodes 51B arranged opposite to the blue color filters 31B across the liquid crystal layer 40. As shown in FIG. 3, the array substrate 50 includes first driving signal lines 61 connected to the red sub-pixel electrodes 51R and the green sub-pixel electrodes 51G constituting the first pixels 10 and to the blue sub-pixel electrodes 51B constituting the second pixels 20, and second driving signal lines 62 connected to the blue sub-pixel electrodes 51B constituting the first pixels 10 and to the red sub-pixel electrodes 51R and the green sub-pixel electrodes 51G constituting the second pixels 20. In FIG. 3, "+" and "−" indicate the polarity of a voltage applied to each sub-pixel electrode. As used herein, the connection between the sub-pixel electrodes and the driving signal lines may be mediated by switching elements such as thin film transistors, as long as the sub-pixel electrodes are driven by electrical signals applied to the driving signal lines.

In Embodiment 1, the red color filters 31R, the green color filters 31G, and the blue color filters 31B extend in parallel to one another in a column direction. The first driving signal lines 61 and the second driving signal lines 62 extend in parallel to one another in a row direction. The first pixels 10 and the second pixels 20 are alternately arranged in the column direction and the row direction. Flicker and horizontal or vertical shadows can be reduced since the brightness depending on the positive polarity and the negative polarity is complemented between vertically adjacent sub-pixels and between transversely adjacent sub-pixels. Further, the first driving signal lines 61 and the second driving signal lines 62 are alternately arranged. Signals of opposite polarities are input to the adjacent pixels due to the alternate arrangement of the first pixels 10 and the second pixels 20 in the column direction and the row direction, so that the color shift is prevented even when a checkerboard pattern is displayed, thus providing good display performance.

The array substrate 50 is an active matrix substrate. The active matrix substrate includes, for example, multiple gate signal lines extending parallel to one another on a transparent substrate; multiple source signal lines extending parallel to one another and orthogonally to the gate signal lines; active elements such as TFTs arranged in positions corresponding to the intersections between the gate signal lines and the source signal lines; and sub-pixel electrodes arranged in regions partitioned by the gate signal lines and the source signal lines to form a matrix. The multiple gate signal lines are connected to a gate driver that applies scanning signals to the gate signal lines. The multiple source signal lines are connected to a source driver that applies gray scale signals to the source signal lines. The sub-pixel electrodes are connected to the gate signal lines and the source signal lines via the switching elements.

In Embodiment 1, the first driving signal lines 61 and the second driving signal lines 62 are gate signal lines, and are connected to a gate driver 70 that applies scanning signals to the gate signal lines. As shown in FIG. 3, the sub-pixel electrodes arranged on the same row are each connected to one of the first driving signal lines 61 and the second driving signal lines 62, which are the gate signal lines. Although not shown, the sub-pixel electrodes arranged on the same column are connected to one source signal line, and each sub-pixel electrode is connected to a source signal line and a gate signal line via the corresponding TFT. This structure enables pseudo dot-reversal driving to reduce the power consumption. In addition, in Embodiment 1, a sub-pixel electrode group in a first row and a sub-pixel electrode group in a second row are arranged with one first driving signal line 61 therebetween, and the first driving signal line 61 is connected to the sub-pixel electrode group in the first row and to the sub-pixel electrode group in the second row and is also alternately connected to three continuous sub-pixel electrodes of the sub-pixel electrode group in the first row and to three continuous sub-pixel electrodes of the sub-pixel electrode group in the second row. Likewise, each second driving signal line 62 is also alternately connected to three continuous sub-pixel electrodes of the sub-pixel electrode group in the first row and to three continuous sub-pixel electrodes of the sub-pixel electrode group in the second row.

AC voltage driving is performed such that, in each first pixel 10 and in each second pixel 20, a voltage of the same polarity is applied to the red sub-pixel electrode 51R and the green sub-pixel electrode 51G and a voltage of the opposite polarity is applied to the blue sub-pixel electrode 51B. For example, when a positive signal is applied to the first driving signal lines 61 and a negative signal is applied to the second driving signal lines 62, as shown in FIG. 3, a positive voltage is applied to the red sub-pixel electrodes 51R and the green sub-pixel electrodes 51G constituting the first pixels 10 and to the blue sub-pixel electrodes 51B constituting the second pixels 20, whereas a negative voltage is applied to the blue sub-pixel electrodes 51B constituting the first pixels 10 and to the red sub-pixel electrodes 51R and the green sub-pixel electrodes 51G constituting the second pixels 20. As a result, in the first pixels 10, the red sub-pixels R, the green sub-pixels G, and the blue sub-pixels B are all dark, whereas in the second pixels 20, the red sub-pixels R, the green sub-pixels G, and the blue sub-pixels B are all bright. Thus, it is possible to reduce the color shift even when AC driving is performed at a low frequency.

In each of the first pixels 10 and the second pixels 20, the green sub-pixel G may be arranged between the red sub-pixel R and the blue sub-pixel B. Among the red sub-pixel R, the green sub-pixel G, and the blue sub-pixel B, the green sub-pixel G has the highest brightness. Thus, when the green sub-pixel G is arranged at the end of a pixel, the brightness is uneven in the pixel. Consequently, when diagonal lines are displayed on a display surface, the lines are not smooth (e.g., jaggy). Arranging the green sub-pixel G between the red sub-pixel R and the blue sub-pixel B can make the diagonal lines look smoother (e.g., less jagged). In Embodiment 1, in each of the first pixels 10 and the second pixels 20, the red sub-pixel R, the green sub-pixel G, and the blue sub-pixel B are arranged in the stated order from the gate driver 70 side in the extending direction of the first driving signal lines 61 and the second driving signal lines 62. Accordingly, as shown in FIG. 3, the sub-pixel electrodes are arranged in positions corresponding to their respective sub-pixels in the order of the red sub-pixel electrode 51R, the green sub-pixel electrode 51G, and the blue sub-pixel electrode 51B from the gate driver 70 side in the extending direction of the first driving signal lines 61 and the second driving signal lines 62.

The color filter substrate 30 includes, for example, a grid-like black matrix and a counter electrode on a transparent substrate. The red color filters 31R, the green color filters 31G, and the blue color filters 31B may be formed inside the grid-like black matrix.

The liquid crystal layer 40 contains liquid crystal molecules. Application of a threshold or higher voltage of the liquid crystal molecules to the liquid crystal layer tilts the liquid crystal molecules, thus allowing the liquid crystal display device to display images.

The first driving signal lines 61 and the second driving signal lines 62 can be formed of a material commonly used in the field of liquid crystal display devices. Examples of the material include metals such as titanium, chromium, aluminium, and molybdenum and alloys thereof. The TFT preferably includes a channel layer made of amorphous silicon, polysilicon, or an oxide semiconductor. Examples of the oxide semiconductor include a compound (In—Ga—Zn—O) formed of indium (In), gallium (Ga), zinc (Zn), and oxygen (O); a compound (In-Tin-Zn—O) formed of indium (In), tin (Tin), zinc (Zn), and oxygen (O); and a compound (In—Al—Zn—O) formed of indium (In), aluminium (Al), zinc (Zn), and oxygen (O).

The red sub-pixel electrodes 51R, the green sub-pixel electrodes 51G, and the blue sub-pixel electrodes 51B may be transparent electrodes. For example, a transparent conductive material such as indium tin oxide (ITO), indium zinc oxide (IZO), zinc oxide (ZnO), or tin oxide (SnO) or an alloy thereof can be used to form these electrodes.

An alignment film may be provided between the color filter substrate 30 and the liquid crystal layer 40, and between the array substrate 50 and the liquid crystal layer 40. The alignment films function to control alignment of the liquid crystal molecules in the liquid crystal layer 40. When a voltage applied to the liquid crystal layer 40 is lower than the threshold value (including when no voltage is applied), the alignment of the liquid crystal molecules in the liquid crystal layer 40 is controlled mainly through the function of the alignment films.

A polarizing plate (linear polarizer) may be arranged on each of the color filter substrate 30 and the array substrate 50, on the side opposite to the liquid crystal layer 40. A typical polarizing plate includes, for example, a polyvinyl alcohol (PVA) film on which an anisotropic material such as an iodine complex having a dichroic property is adsorbed and aligned. An optical film such as a phase difference film may be arranged between the color filter substrate 30 and the polarizing plate, and between the array substrate 50 and the polarizing plate.

The liquid crystal display panel usually has a structure in which the color filter substrate 30 and the array substrate 50 are bonded to each other by a sealing material provided to surround the liquid crystal layer 40 so that the liquid crystal layer 40 is kept in a predetermined region. Examples of the sealing material include epoxy resin containing inorganic filler or organic filler and a curing agent.

A liquid crystal display device of Embodiment 1 may include a backlight at the rear side thereof. The liquid crystal display device having the above structure is generally referred to as a "transmission type liquid crystal display device". Any backlight that emits light including visible light may be used. The backlight may emit only visible light or may emit both visible light and ultraviolet light. To enable display of color images on the liquid crystal display device, a backlight that emits white light is preferably used. A preferred type of the backlight is a light emitting diode (LED), for example. As used herein, the term "visible light" refers to light (electromagnetic ray) having a wavelength of 380 nm or longer and shorter than 800 nm.

The liquid crystal display device may further include, in addition to the liquid crystal display panel and the backlight, multiple members including external circuits such as a tape carrier package (TCP) and a printed circuit board (PCB); optical films such as a viewing angle expansion film and a luminance-improving film; and a bezel (frame). Some members may be incorporated into other members. Members other than those that have been described are not particularly limited, and any members that are commonly used in the field of liquid crystal display devices can be used. Thus, the description thereof is omitted.

In Embodiment 1, AC voltage driving is performed such that, in each first pixel 10 and in each second pixel 20, a voltage of the same polarity is applied to the red sub-pixel electrode and the green sub-pixel electrode and a voltage of the opposite polarity is applied to the blue sub-pixel electrode. Thus, in one pixel, the red sub-pixel R, the green sub-pixel G, and the blue sub-pixel B are all dark when a positive voltage is applied to the first driving signal lines or the second driving signal lines, whereas the red sub-pixel R, the green sub-pixel G, and the blue sub-pixel B are all bright when a negative voltage is applied to the first driving signal lines or the second driving signal lines. As a result, the color shift can be reduced. In addition, in each of the first pixels 10 and the second pixels 20, the green sub-pixel G is arranged between the red sub-pixel R and the blue sub-pixel B. Such arrangement can make diagonal lines look smoother (e.g., less jagged) when the diagonal lines are displayed. Signals of opposite polarities are input to the adjacent pixels due to the alternate arrangement of the first pixels 10 and the second pixels 20 in the column direction and the row direction, so that the color shift is prevented even when a checkerboard pattern is displayed, providing good display performance. Further, owing to so-called "pseudo dot-reversal driving method", the power consumption can be reduced.

Comparative Embodiment 1

Figure 7:
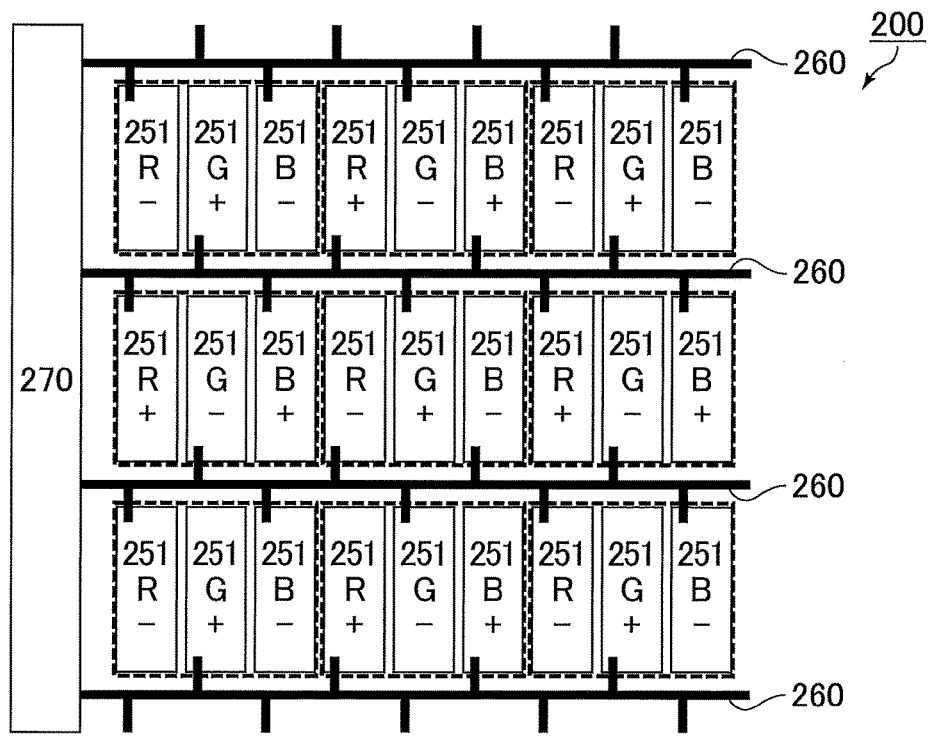
FIG. 7 is a schematic plan view of an array substrate of a liquid crystal display device according to Comparative Embodiment 1.
Figure 8:
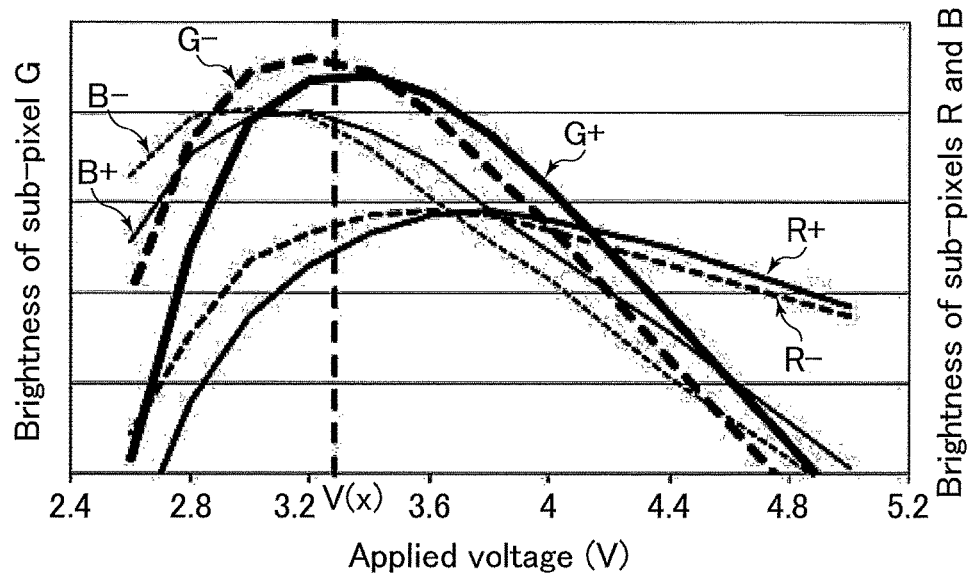
FIG. 8 is a graph showing a relationship between applied voltage and brightness of sub-pixels.
Figure 9:
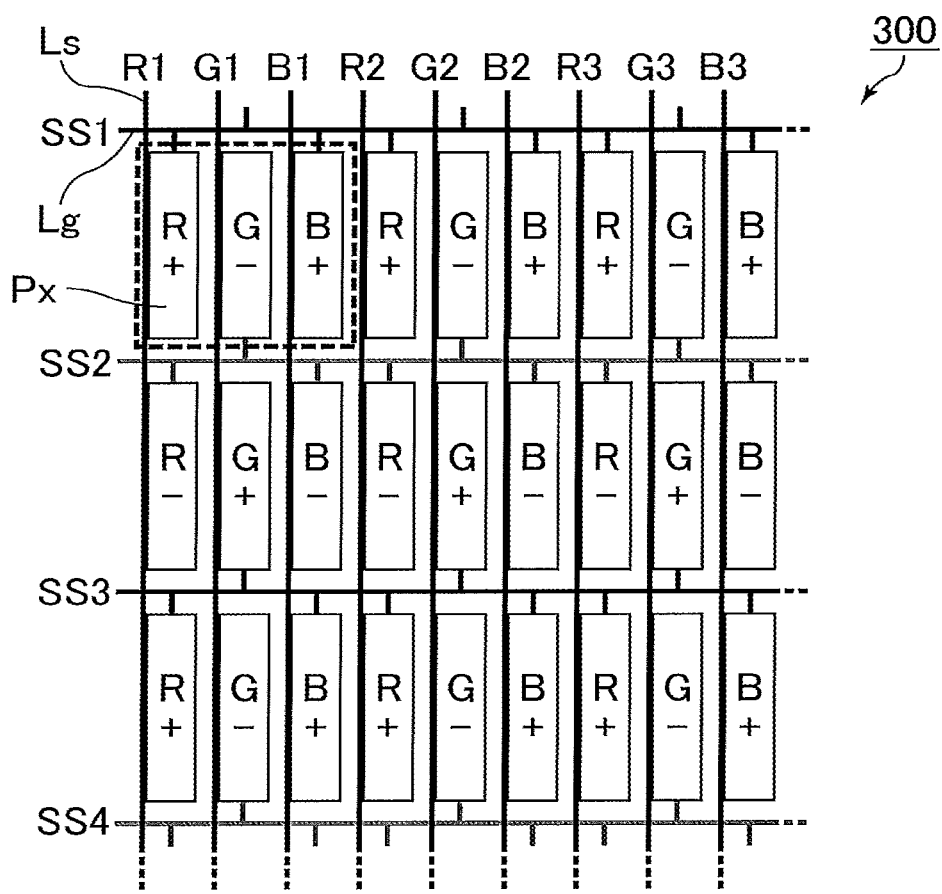
FIG. 9 is a schematic plan view of an array substrate of a liquid crystal display device according to Patent Literature 3.

Comparative Embodiment 1 is described below in which sub-pixel electrodes located above and below a gate signal line are alternately connected to the gate signal line. FIG. 7 is a schematic plan view of an array substrate of a liquid crystal display device according to Comparative Embodiment 1. In a liquid crystal display device 200 of Comparative Embodiment 1, red color filters, green color filters, and blue color filters extend in parallel to one another in the column direction. In addition, red sub-pixel electrodes 251R, green sub-pixel electrodes 251G, and blue sub-pixel electrodes 251B are arranged at positions respectively corresponding to the red color filters, the green color filters, and the blue color filters. As shown in FIG. 7, the sub-pixel electrodes arranged on the same row are connected to one of gate signal lines 260. The gate signal lines 260 are connected to a gate driver 270. Although not shown, the sub-pixel electrodes arranged on the same column are connected to one source signal line, and each sub-pixel electrode is connected to the source signal line and the gate signal line via the corresponding TFT. A sub-pixel electrode group in a first row and a sub-pixel electrode group in a second row are arranged with one gate signal line 260 therebetween, and the gate signal line 260 is alternately connected to the sub-pixel electrodes of the sub-pixel electrode group in the first row and to the sub-pixel electrodes of the sub-pixel electrode group in the second row.

In Comparative Embodiment 1, the color shift was observed depending on the polarity of the applied voltage when white was displayed in low-frequency driving of a normally black liquid crystal display device. The color shift was noticeable especially when a checkerboard pattern was displayed. Such a display defect can be explained as follows.

The polarity of a signal applied from the gate signal lines 260 is reversed in each frame, so that the polarity is switched depending on the driving frequency. When a positive voltage is applied to the green sub-pixel electrodes 251G, a negative voltage is applied to the red sub-pixel electrodes 251R and the blue sub-pixel electrodes 251B, which are adjacent to the green sub-pixel electrodes 251G. Thus, the green sub-pixels G appear dark, the red sub-pixels R appear bright, and the blue sub-pixels B appear dark. As a result, color changes occur between cyan (a combination of green and blue) and red when white is displayed. Such color changes are similar to changes in hue between red and green, and thus can be easily perceived as the color shift. When a checkerboard pattern is displayed, the color difference is emphasized and can be more easily perceived.

Embodiment 2

Figure 4:
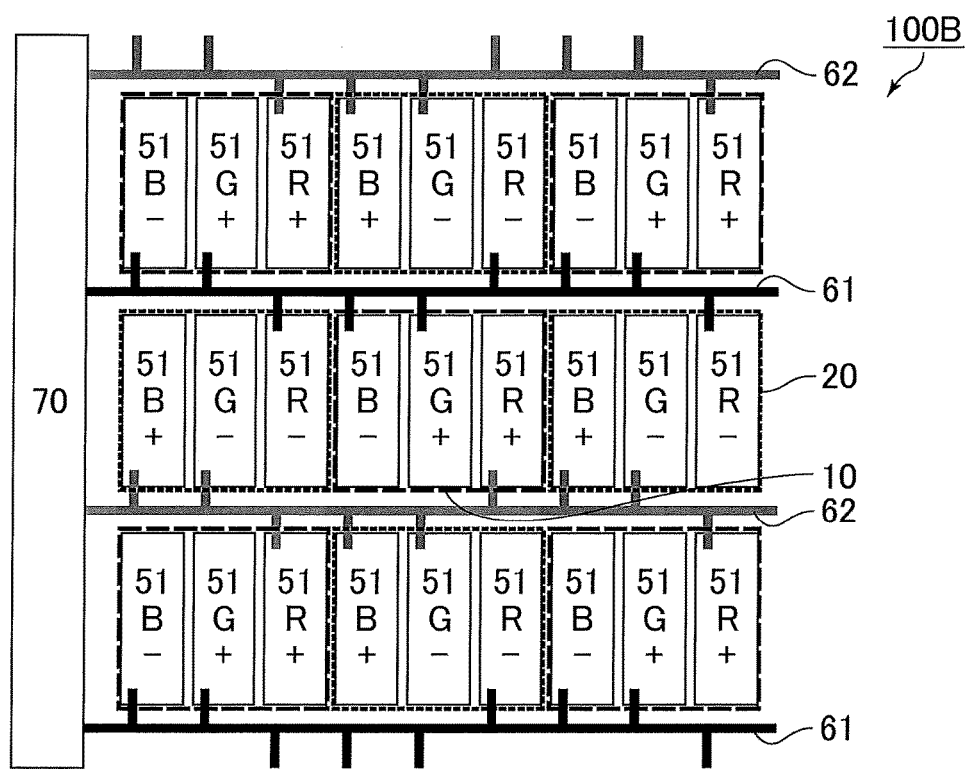
FIG. 4 is a schematic plan view of an array substrate of a liquid crystal display device according to Embodiment 2.

A liquid crystal display device of Embodiment 2 is the same as that of the Embodiment 1 except that the order of arrangement of the sub-pixels was changed in the first pixels 10 and the second pixels 20. FIG. 4 is a schematic plan view of an array substrate of a liquid crystal display device according to Embodiment 2. In a liquid crystal display device 100B of Embodiment 2, in each of the first pixels 10 and the second pixels 20, the red sub-pixel R, the green sub-pixel G, and the blue sub-pixel B are arranged in the stated order from the gate driver 70 side in the extending direction of the first driving signal lines 61 and the second driving signal lines 62. Accordingly, as shown in FIG. 4, the sub-pixel electrodes are arranged in positions corresponding to their respective sub-pixels in the order of the blue sub-pixel electrode 51B, the green sub-pixel electrode 51G, and the red sub-pixel electrode 51R from the gate driver 70 side in the extending direction of the first driving signal lines 61 and the second driving signal lines 62. As in Embodiment 1, a liquid crystal display device with excellent display quality in which the color shift is reduced without increasing power consumption can be obtained in Embodiment 2.

Embodiment 3

A liquid crystal display device of Embodiment 3 is the same as that of the Embodiment 1 except that the first driving signal lines 61 and the second driving signal lines 62 are source signal lines, that the red color filters 31R, the green color filters 31G, and the blue color filters 31B extend in parallel to one another in the row direction, and that the first driving signal lines 61 and the second driving signal lines 62 extend in parallel to one another in the column direction.

Figure 5:
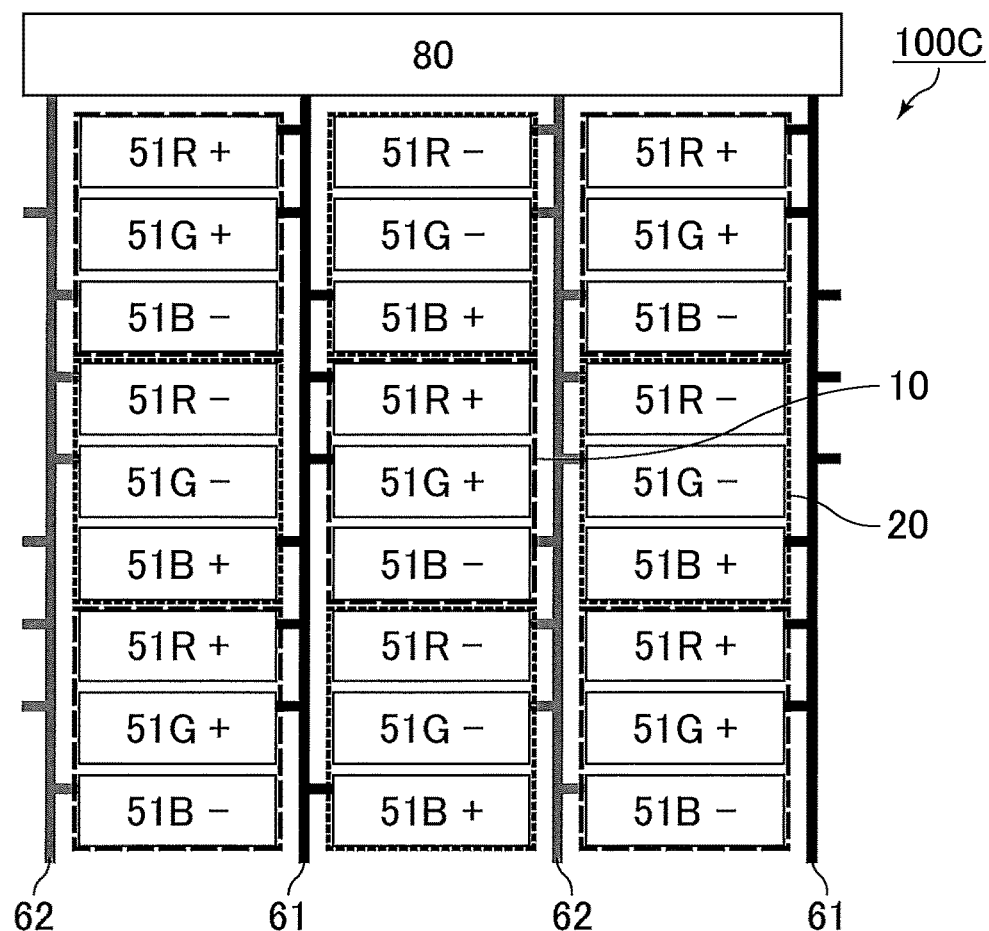
FIG. 5 is a schematic plan view of an array substrate of a liquid crystal display device according to Embodiment 3.

FIG. 5 is a schematic plan view of an array substrate of a liquid crystal display device according to Embodiment 3. In a liquid crystal display device 100C of Embodiment 3, the first driving signal lines 61 and the second driving signal lines 62 are source signal lines, and are connected to a source driver 80 that applies gray scale signals to the source signal lines. As shown in FIG. 5, the sub-pixel electrodes arranged on the same column are each connected to one of the first driving signal lines 61 and the second driving signal lines 62, which are the source signal lines. Although not shown, the sub-pixel electrodes arranged on the same row are connected to one gate signal line, and each sub-pixel electrode is connected to a source signal line and a gate signal line via the corresponding TFT. This structure enables pseudo dot-reversal driving to reduce the power consumption. In addition, in Embodiment 3, a sub-pixel electrode group in a first column and a sub-pixel electrode group in a second column are arranged with one first driving signal line 61 therebetween, and the driving signal line 61 is connected to the sub-pixel electrodes of the sub-pixel electrode group in the first column and to the sub-pixel electrodes of the sub-pixel electrode group in the second column and is also alternately connected to three continuous sub-pixel electrodes of the sub-pixel electrode group in the first column and to three continuous sub-pixel electrodes of the sub-pixel electrode group in the second column. Likewise, each second driving signal line 62 is alternately connected to three continuous sub-pixel electrodes of the sub-pixel electrode group in the first column and to three continuous sub-pixel electrodes of the sub-pixel electrode group in the second column.

In Embodiment 3, the red color filters 31R, the green color filters 31G, and the blue color filters 31B extend in parallel to one another in the row direction; the first driving signal lines 61 and the second driving signal lines 62 extend in parallel to one another in the column direction; and the first pixels 10 and the second pixels 10 are alternately arranged in the column direction and the row direction. Further, the first driving signal lines 61 and the second driving signal lines 62 are alternately arranged. In addition, in each of the first pixels 10 and the second pixels 20, the red sub-pixel R, the green sub-pixel G, and the blue sub-pixel B are arranged in the stated order from the source driver 80 side in the extending direction of the first driving signal lines 61 and the second driving signal lines 62. Accordingly, as shown in FIG. 5, the sub-pixel electrodes are arranged in positions corresponding to their respective sub-pixels in the order of the red sub-pixel electrode 51R, the green sub-pixel electrode 51G, and the blue sub-pixel electrode 51B from the source driver 80 side in the extending direction of the first driving signal lines 61 and the second driving signal lines 62. As in Embodiment 1, a liquid crystal display device with excellent display quality in which the color shift is reduced without increasing power consumption can be obtained in Embodiment 3.

Embodiment 4

Figure 6:
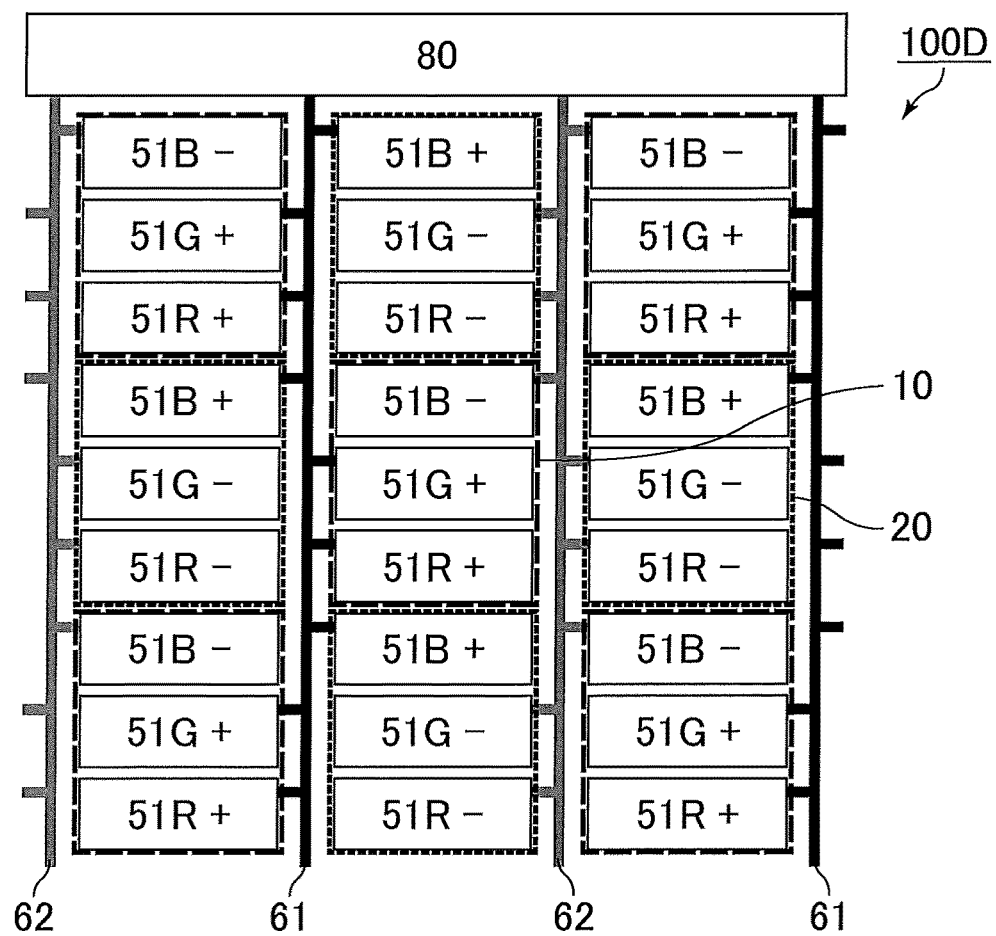
FIG. 6 is a schematic plan view of an array substrate of a liquid crystal display device according to Embodiment 4.

A liquid crystal display device of Embodiment 4 is the same as that of the Embodiment 3 except that the order of arrangement of the sub-pixels was changed in the first pixels 10 and the second pixels 20. FIG. 6 is a schematic plan view of an array substrate of a liquid crystal display device according to Embodiment 4. In a liquid crystal display device 100D of Embodiment 4, in each of the first pixels 10 and the second pixels 20, the blue sub-pixel B, the green sub-pixel G, and the red sub-pixel R are arranged in the stated order from the source driver 80 side in the extending direction of the first driving signal lines 61 and the second driving signal lines 62. Accordingly, as shown in FIG. 6, the sub-pixel electrodes are arranged in positions corresponding to their respective sub-pixels in the order of the blue sub-pixel electrode 51B, the green sub-pixel electrode 51G, and the red sub-pixel electrode 51R from the source driver 80 side in the extending direction of the first driving signal lines 61 and the second driving signal lines 62. As in Embodiment 1, a liquid crystal display device with excellent display quality in which the color shift is reduced without increasing power consumption can be obtained in Embodiment 4.

APPENDIX

According to an aspect of the present invention, there may be provided a liquid crystal display including: first pixels and second pixels arranged on a display surface, each pixel including a red sub-pixel, a green sub-pixel, and a blue sub-pixel; a color filter substrate; a liquid crystal layer; and an array substrate, the color filter substrate, the liquid crystal layer, and the array substrate being arranged in the stated order, the color filter substrate including: red color filters, green color filters, and blue color filters, the array substrate including: red sub-pixel electrodes arranged opposite to the red color filters across the liquid crystal layer; green sub-pixel electrodes arranged opposite to the green color filters across the liquid crystal layer; blue sub-pixel electrodes arranged opposite to the blue color filters across the liquid crystal layer; first driving signal lines connected to the red sub-pixel electrodes and the green sub-pixel electrodes constituting the first pixels and to the blue sub-pixel electrodes constituting the second pixels; and second driving signal lines connected to the blue sub-pixel electrodes constituting the first pixels and to the red sub-pixel electrodes and the green sub-pixel electrodes constituting the second pixels, wherein AC voltage driving is performed such that, in each first pixel and in each second pixel, a voltage of the same polarity is applied to the red sub-pixel electrode and the green sub-pixel electrode and a voltage of a polarity opposite to that of the green sub-pixel electrode is applied to the blue sub-pixel electrode.

In each of the first pixels and the second pixels, the green sub-pixel may be arranged between the red sub-pixel and the blue sub-pixel.

The red color filters, the green color filters, and the blue color filters may extend in parallel to one another in the column direction; the first driving signal lines and the second driving signal lines may extend in parallel to one another in the row direction; and the first pixels and the second pixels may be alternately arranged in the column direction and the row direction. The column direction is not particularly limited as long as it is a direction in which the red color filters, the green color filters, and the blue color filters extend in parallel to one another. Thus, in the case where the direction in which the red color filters, the green color filters, and the blue color filters extend in parallel to one another is defined as the row direction, the above description may be restated as follows: the red color filters, the green color filters, and the blue color filters extend in parallel to one another in the row direction; the first driving signal lines and the second driving signal lines extend in parallel to one another in the column direction; and the first pixels and the second pixels are alternately arranged in the column direction and the row direction.

The first driving signal lines and the second driving signal lines may be gate signal lines, and may be connected to a gate driver that applies scanning signals to the gate signal lines.

The first driving signal lines and the second driving signal lines may be source signal lines, and may be connected to a source driver that applies gray scale signals to the source signal lines.

The aforementioned modes of the embodiments may be employed in appropriate combination as long as the combination is not beyond the spirit of the present invention.

REFERENCE SIGNS LIST

10: first pixel
20: second pixel
30: color filter substrate
40: liquid crystal layer
50: array substrate
31R: red color filter
31G: green color filter
31B: blue color filter
51R, 251R: red sub-pixel electrode
51G, 251G: green sub-pixel electrode
51B, 251B: blue sub-pixel electrode
61: first driving signal line
62: second driving signal line
70, 270: gate driver
80: source driver
100A: liquid crystal display device of Embodiment 1
100B: liquid crystal display device of Embodiment 2
100C: liquid crystal display device of Embodiment 3
100D: liquid crystal display device of Embodiment 4
200: liquid crystal display device of Comparative Embodiment 1
260: gate signal line
300: liquid crystal display panel of Patent Literature 3
B: blue sub-pixel
G: green sub-pixel
R: red sub-pixel

The invention claimed is:
1. A liquid crystal display device, comprising:
first pixels and second pixels arranged on a display surface, each pixel including a red sub-pixel, a green sub-pixel, and a blue sub-pixel;
a color filter substrate;
a liquid crystal layer; and
an array substrate, the color filter substrate, the liquid crystal layer, and the array substrate being arranged in the stated order,
the color filter substrate comprising:
red color filters, green color filters, and blue color filters,
the array substrate comprising:
red sub-pixel electrodes arranged opposite to the red color filters across the liquid crystal layer;
green sub-pixel electrodes arranged opposite to the green color filters across the liquid crystal layer;
blue sub-pixel electrodes arranged opposite to the blue color filters across the liquid crystal layer;
first driving signal lines connected to the red sub-pixel electrodes and the green sub-pixel electrodes constituting the first pixels and to the blue sub-pixel electrodes constituting the second pixels; and
second driving signal lines connected to the blue sub-pixel electrodes constituting the first pixels and to the red sub-pixel electrodes and the green sub-pixel electrodes constituting the second pixels,
wherein AC voltage driving is performed such that, in each first pixel and in each second pixel, a voltage of the same polarity is applied to the red sub-pixel electrode and the green sub-pixel electrode and a voltage of a polarity opposite to that of the green sub-pixel electrode is applied to the blue sub-pixel electrode.

2. The liquid crystal display device according to claim 1,
wherein in each of the first pixels and the second pixels,
the green sub-pixel is arranged between the red sub-pixel and the blue sub-pixel.

3. The liquid crystal display device according to claim 1,
wherein the red color filters, the green color filters, and the blue color filters extend in parallel to one another in a column direction,
the first driving signal lines and the second driving signal lines extend in parallel to one another in a row direction, and
the first pixels and the second pixels are alternately arranged in the column direction and the row direction.

4. The liquid crystal display device according to claim 1,
wherein the first driving signal lines and the second driving signal lines are gate signal lines, and
the first driving signal lines and the second driving signal lines are connected to a gate driver that applies scanning signals to the gate signal lines.

5. The liquid crystal display device according to claim 1,
wherein the first driving signal lines and the second driving signal lines are source signal lines, and
the first driving signal lines and the second driving signal lines are connected to a source driver that applies gray scale signals to the source signal lines.

* * * * *